US012713404B2

(12) United States Patent
Li et al.

(10) Patent No.: US 12,713,404 B2
(45) Date of Patent: Aug. 18, 2026

(54) RESOURCE SELECTION METHOD AND APPARATUS FOR SIDELINK, AND USER EQUIPMENT

(71) Applicant: CICT CONNECTED AND INTELLIGENT TECHNOLOGIES CO., LTD., Chongqing (CN)

(72) Inventors: Chenxin Li, Chongqing (CN); Rui Zhao, Chongqing (CN)

(73) Assignee: CICT CONNECTED AND INTELLIGENT TECHNOLOGIES CO., LTD., Chongqing (CN)

( * ) Notice: Subject to any disclaimer, the term of this patent is extended or adjusted under 35 U.S.C. 154(b) by 306 days.

(21) Appl. No.: 18/431,125

(22) Filed: Feb. 2, 2024

(65) Prior Publication Data

US 2024/0179680 A1 May 30, 2024

Related U.S. Application Data

(63) Continuation of application No. PCT/CN2022/114800, filed on Aug. 25, 2022.

(30) Foreign Application Priority Data

Sep. 27, 2021 (CN) .......................... 202111138621.2

(51) Int. Cl.
*H04W 72/02* (2009.01)
*H04W 72/25* (2023.01)
(Continued)

(52) U.S. Cl.
CPC ........... *H04W 72/02* (2013.01); *H04W 72/25* (2023.01); *H04W 72/40* (2023.01); *H04W 76/28* (2018.02); *H04W 92/18* (2013.01)

(58) Field of Classification Search
CPC ..... H04W 72/02; H04W 76/28; H04W 72/25; H04W 72/40; H04W 92/18
See application file for complete search history.

(56) References Cited

U.S. PATENT DOCUMENTS

2021/0045093 A1* 2/2021 Rao ........................ H04W 76/14
2021/0050931 A1 2/2021 Hahn et al.
2022/0377733 A1* 11/2022 Ko ........................ H04L 5/0037

FOREIGN PATENT DOCUMENTS

CN 107889073 A 4/2018
CN 109792718 A 5/2019
(Continued)

OTHER PUBLICATIONS

Fujitsu, Considerations on partial sensing and DRX in NR sidelink, R1-2102719, 3GPP TSG RAN WG1 Meeting #104b-e, dated Apr. 6, 2021.

(Continued)

*Primary Examiner* — Samina F Choudhry
(74) *Attorney, Agent, or Firm* — Westbridge IP LLC

(57) ABSTRACT

Disclosed are a resource selection method and a resource selection apparatus for sidelink, and a user equipment. The method is applied to a user equipment (UE) and includes: when the UE expects to perform resource selection or determines to perform resource selection, performing the following steps: performing a target operation, where the target operation includes at least one of determining a resource sensing mechanism, determining an existing resource sensing result, determining a candidate resource set, and determining a partial sensing occasion and performing partial sensing; performing resource exclusion; and performing resource selection.

19 Claims, 4 Drawing Sheets

(51) Int. Cl.
*H04W 72/40* (2023.01)
*H04W 76/28* (2018.01)
*H04W 92/18* (2009.01)

(56) References Cited

FOREIGN PATENT DOCUMENTS

| | | | |
|---|---|---|---|
| CN | 110891289 | A | 3/2020 |
| CN | 111148226 | A | 5/2020 |
| CN | 112512008 | A | 3/2021 |
| CN | 112512124 | A | 3/2021 |
| EP | 3574694 | A1 | 12/2019 |
| WO | 2021007686 | A1 | 1/2021 |
| WO | 2021181708 | A1 | 9/2021 |

OTHER PUBLICATIONS

International Search Report issued in corresponding PCT Application No. PCT/CN2022/114800, dated Oct. 24, 2022.

Extended European Search Report issued in counterpart European Patent Application No. 22871746.8, dated Oct. 16, 2024.

Huawei et al., Discussion and Decision on Sidelink resource allocation to reduce power consumption, R1-2106477, 3GPP TSG RAN WG1 Meeting #106-e, dated Aug. 7, 2021.

NTT DOCOMO, Inc et al., Discussion on sidelink resource allocation for power saving, R1-2107879, 3GPP TSG RAN WG1 #106-e, dated Aug. 6, 2021.

Catt, Gohigh, Discussion on sidelink resource allocation enhancements for power saving, R1-2108238, 3GPP TSG RAN WG1 #106-e, dated Aug. 13, 2021.

First Office Action issued in counterpart Chinese Patent Application No. 202111138621.2, dated Feb. 28, 2025.

Notice of Reasons for Refusal issued in counterpart Japanese Patent Application No. JP 2024-506278, dated Jan. 14, 2025.

LG Electronics, Discussion on resource allocation for power saving, R1-2107528, 3GPP TSG RAN WG1 Meeting #106-e, dated Aug. 7, 2021.

Request for the Submission of an Opinion issued in counterpart Korean Patent Application No. KR 10-2024-7003466, dated Jan. 30, 2026.

* cited by examiner

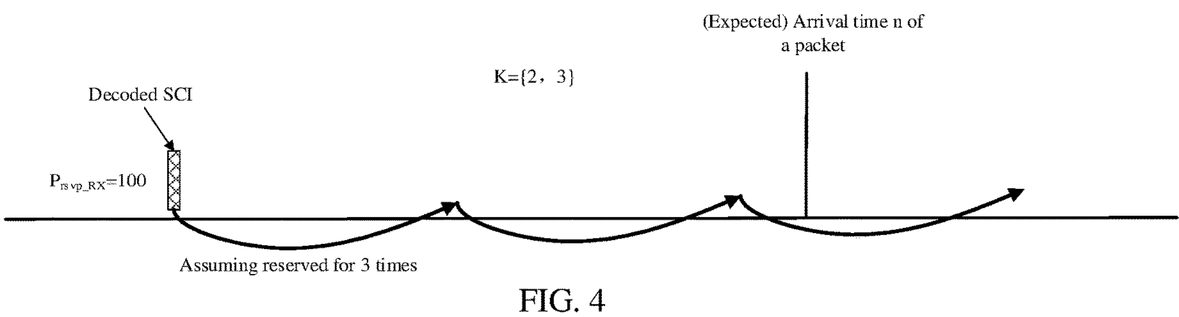
FIG. 4
(Expected) Arrival time n of a packet
K = 1110000000
Decoded SCI
$P_{rsvp\_RX}$ = 100
Assuming reserved for 3 times
FIG. 5
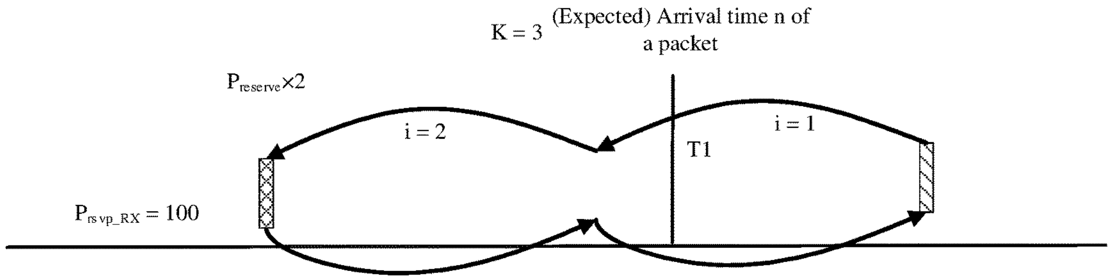
Assuming reserved for 2 times
FIG. 6
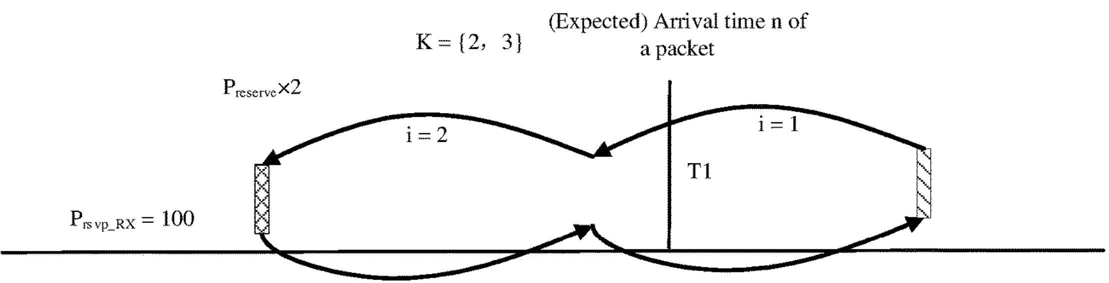
Assuming reserved for 2 times
FIG. 7

RESOURCE SELECTION METHOD AND APPARATUS FOR SIDELINK, AND USER EQUIPMENT

CROSS-REFERENCE TO RELATED APPLICATIONS

This application is a continuation of International Application No. PCT/CN2022/114800, filed on Aug. 25, 2022, which claims priority to Chinese Patent Application No. 202111138621.2, filed on Sep. 27, 2021. The disclosures of the aforementioned applications are hereby incorporated by reference in their entireties.

TECHNICAL FIELD

The present disclosure relates to the field of communications technologies, and in particular, to a resource selection method and a resource selection apparatus for sidelink, and a user equipment.

BACKGROUND

An application scenario of sidelink communication includes but is not limited to vehicle-to-everything (V2X), public security, a commercial scenario, and the like. The V2X is one of most typical application scenarios. The V2X supports communication manners such as vehicle-to-vehicle (V2V), vehicle-to-infrastructure (V2I), vehicle-to-pedestrian (V2P), and vehicle-to-network (V2N). For a case in which a pedestrian cannot ensure continuously sufficient power supply of a V2X device (such as a pedestrian user equipment (P-UE), (Vulnerable Road Users, VRU)), or power saving is required (such as endurance capability of a vehicle is insufficient or a road side device does not need to work continuously when there are few vehicles), a power-saving mechanism of a user equipment (UE) needs to be considered.

Currently, for a sidelink application scenario, an application scenario of a power-saving terminal is generally a city scenario with relatively high node density, congestion is caused by a limited sensing result and high potential node density, and thus it is difficult to effectively ensure reliability of partial sensing. In view of this, a proper resource selection method for sidelink needs to be designed, to ensure accuracy of resource selection and transmission reliability as far as possible in a power-saving mechanism.

SUMMARY

The present disclosure provides a resource selection method and a resource selection apparatus for sidelink, and a user equipment, to solve a problem that accuracy of resource selection and transmission reliability cannot be ensured in a power-saving mechanism.

According to a first aspect, an embodiment of the present disclosure provides a resource selection method for sidelink, applied to a user equipment UE and including:

when the UE expects to perform resource selection or determines to perform resource selection, performing the following steps:

performing a target operation, where the target operation includes at least one of determining a resource sensing mechanism, determining an existing resource sensing result, determining a candidate resource set, and determining a partial sensing occasion and performing partial sensing;

performing resource exclusion; and performing resource selection.

According to a second aspect, an embodiment of the present disclosure provides a user equipment, including: a transceiver, a memory, a processor, and a computer program stored in the memory and capable of running on the processor. When the processor executes the computer program, steps of the resource selection method for sidelink are implemented according to the first aspect.

According to a third aspect, an embodiment of the present disclosure provides a resource selection apparatus for sidelink, applied to a user equipment UE and including:

a first processing module, configured to perform the following steps when the UE expects to perform resource selection or determines to perform resource selection:

performing a target operation, where the target operation includes at least one of determining a resource sensing mechanism, determining an existing resource sensing result, determining a candidate resource set, and determining a partial sensing occasion and performing partial sensing;

performing resource exclusion; and performing resource selection.

According to a fourth aspect, an embodiment of the present disclosure provides a computer-readable storage medium, on which a computer program is stored. When the computer program is executed by a processor, steps of the resource selection method for sidelink according to the first aspect are implemented.

Beneficial effects of the foregoing technical solutions in the present disclosure are as follows.

In the foregoing solution, when expecting to perform resource selection or determining to perform resource selection, the user equipment UE performs the following steps: performing a target operation, where the target operation includes at least one of determining a resource sensing mechanism, determining an existing resource sensing result, determining a candidate resource set, and determining a partial sensing occasion and performing partial sensing; performing resource exclusion; and performing resource selection. In a resource selection process, a resource sensing mechanism, an existing resource sensing result, a candidate resource set, and a partial sensing occasion are considered, so that accuracy of resource selection and transmission reliability in a power-saving mechanism can be ensured.

BRIEF DESCRIPTION OF THE DRAWINGS

FIG. 4 is a schematic diagram 3 of periodic resource reservation according to an embodiment of the present disclosure.

FIG. 5 is a schematic diagram 4 of periodic resource reservation according to an embodiment of the present disclosure.

FIG. 6 is a schematic diagram 5 of periodic resource reservation according to an embodiment of the present disclosure.

FIG. 7 is a schematic diagram 6 of periodic resource reservation according to an embodiment of the present disclosure.

DETAILED DESCRIPTION OF THE EMBODIMENTS

Figures 1, 2, 3:
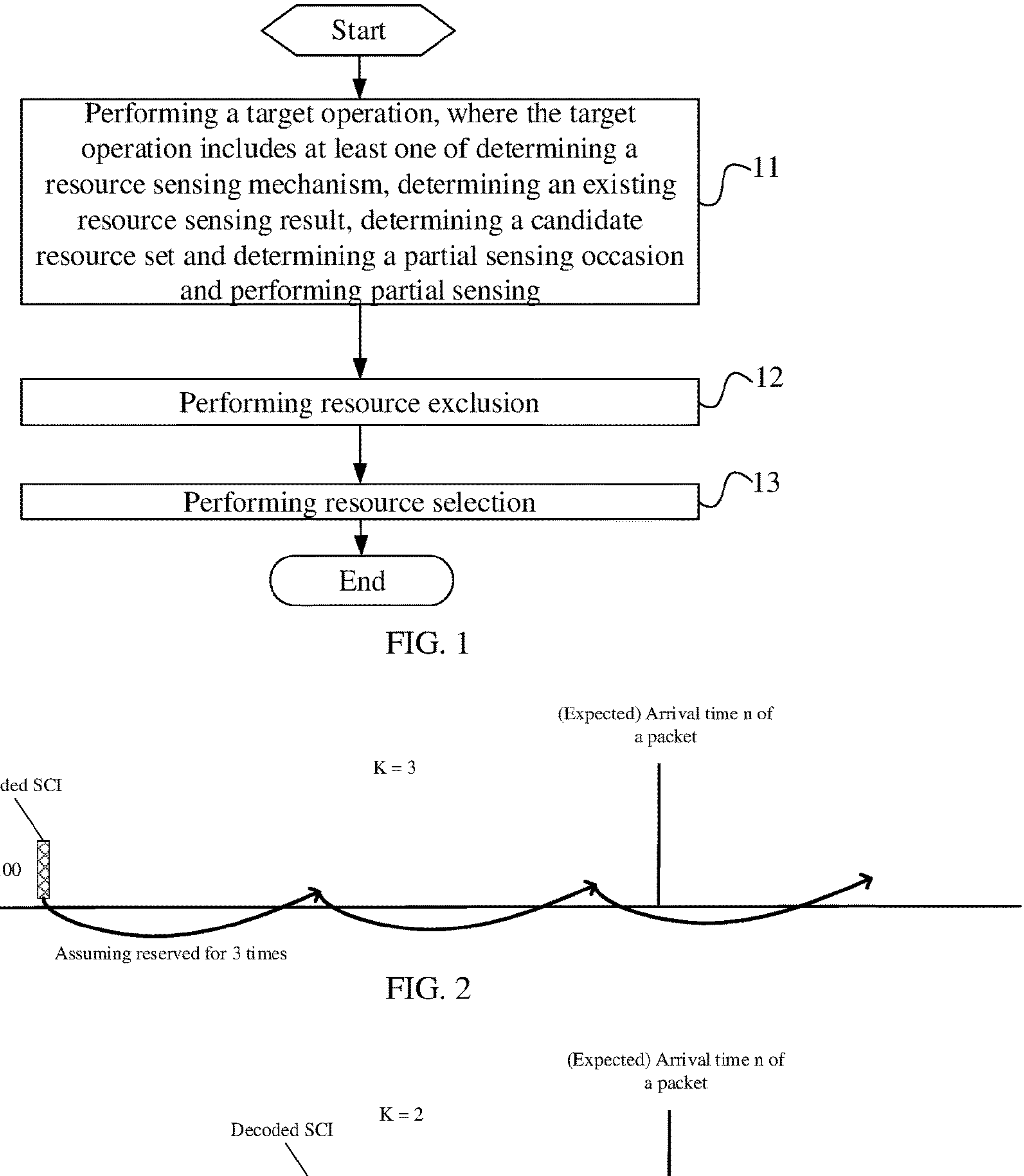
FIG. 1 is a flowchart of a resource selection method for sidelink according to an embodiment of the present disclosure.
FIG. 2 is a schematic diagram 1 of periodic resource reservation according to an embodiment of the present disclosure.
FIG. 3 is a schematic diagram 2 of periodic resource reservation according to an embodiment of the present disclosure.

To make the technical problems to be solved, technical solutions, and advantages of the present disclosure clearer, the following describes the present disclosure in detail with reference to the accompanying drawings and specific embodiments. In the following description, specific details such as specific configurations and components are provided only to help fully understand the embodiments of the present disclosure. Therefore, a person skilled in the art should understand that various changes and modifications may be made to the embodiments described herein without departing from the scope and spirit of the present disclosure. In addition, for clarity and simplicity, descriptions of known functions and constructions are omitted.

It should be understood that, “one embodiment” and “an embodiment” throughout this specification means that specific features, structures or characteristics related to the embodiments may be included in at least one embodiment of the present disclosure. Therefore, descriptions of “in one embodiment” or “in an embodiment” in various places throughout this specification are not necessarily referring to a same embodiment. In addition, the specific features, structures, or characteristics may be combined in one or more embodiments in any appropriate manner.

In the embodiments of the present disclosure, it should be understood that, sequence numbers of the foregoing processes do not mean execution sequences. The execution sequences of the processes should be determined according to functions and internal logic of the processes, and should not be construed as any limitation on the implementation processes of the embodiments of the present disclosure.

The terms “system” and “network” in this specification may often be used interchangeably.

In the embodiments of the present disclosure, it should be understood that, “B that is corresponding to A” means that B is associated with A, and B may be determined based on A. However, it should also be understood that, determining B based on A does not mean determining B based only on A, but instead B may be determined based on A and/or other information.

In embodiments of the present disclosure, a form of an access network is not limited, and may be an access network including a macro base station, a pico base station, a 3G mobile base station (Node B), an enhanced base station (CNB), a home enhanced base station (Femto eNB or Home eNode B or Home eNB or HeNB), a relay station, an access point, a remote radio unit (RRU), a remote radio head (RRH), and the like. The user terminal may be a mobile phone (or a smart phone), or another device that can send or receive a wireless signal, including a user equipment, a personal digital assistant (PDA), a wireless modem, a wireless communications apparatus, a handheld apparatus, a laptop computer, a cordless phone, a wireless local loop (WLL) station, a customer premise equipment (CPE) or a mobile smart hotspot that can convert a mobile signal into a Wi-Fi signal, a smart home appliance, or a device that can communicate with a mobile communications network spontaneously without being operated by anyone.

The following briefly describes the technical terms involved in the present disclosure.

I. Periodic-Based Partial Sensing (PBPS) and Contiguous Partial Sensing (CPS)

The CPS is mainly used to perform, in a resource selection process, exclusion on a resource of a transport block (TB) reserved/occupied by an indication of a previous transmission of a same TB. The PBPS is mainly used to perform, in a resource selection process, exclusion on a resource that has been periodically reserved/occupied in a candidate resource. A sensing occasion (which is a resource location of PreserveXK before the candidate resource) of the PBPS is determined based on two types of determination parameters: a parameter ($P_{reserve}$) for determining a period and a parameter (K) for determining a quantity of corresponding periods, $P_{reserve}$ is used just for case of description and is not limited to be defined as the name, and K is the same.

II. 3GPP Long Term Evolution (LTE)-V2X Supports a Partial Sensing Mechanism Based on Periodic Service Transmission, but Performs Partial Sensing and Resource Selection Only for a Typical Service of Periodic Transmission.

III. Periodic Reservation Mechanism in a Related Technology

For a sensing operation, if resource reservation information obtained by decoding SCI is a periodic reservation, according to a definition in a related mechanism, the periodic reservation indicated by the SCI is the next time.

In addition, in a case of $P_{rsvp\_RX}<T_{scal}$, if a condition ($n'-m\leq P'_{rsvp\_RX}$) is met, a quantity of periodical reservations is $Q=\lceil T_{scal}/P_{rsvp\_RX}\rceil$, and $T_{scal}=T2$. $P_{rsvp\_RX}$ denotes a resource reservation period obtained by decoding of the SCI, n' denotes a logical slot corresponding to an arrival time of a packet or a logical slot of the closest first resource pool located after an arrival time of a packet; m denotes a time for decoding the SCI, T2 denotes a parameter for determining an ending time of a resource selection window; and $P'_{rsvp\_RX}$ denotes a quantity of logical slots correspondingly converted in a resource pool according to a resource reservation period indication value $P_{rsvp\_RX}$ obtained by decoding the SCI.

For a non-power saving mechanism, a UE performs full sensing, which can sense all resources locations in a sensing window, so that reliability can be effectively ensured. For a power-saving mechanism, only a limited sensing result can be obtained through partial sensing. Especially for a V2X scenario, an application scenario of a power-saving terminal is generally a city scenario with relatively high node density, congestion is caused by a limited sensing result and high potential node density, and thus it is difficult to effectively ensure reliability of partial sensing. In view of this, a reservation mechanism needs to be enhanced.

Specifically, embodiments of the present disclosure provide a resource selection method and apparatus for sidelink and a user equipment, to solve a problem in a related technology that accuracy of resource selection and transmission reliability cannot be ensured in a power-saving mechanism.

Embodiment 1

As shown in FIG. 1, an embodiment of the present disclosure provides a resource selection method for sidelink, applied to a user equipment UE. When the UE expects to perform resource selection or determines to perform resource selection, the following steps are performed.

Step 11: Performing a target operation, where the target operation includes at least one of determining a resource sensing mechanism, determining an existing resource sensing result, determining a candidate resource set, and determining a partial sensing occasion and performing partial sensing.

In this step, the existing resource sensing result may include a sensing result acquired by periodic-based partial sensing PBPS of another sidelink process, a sensing result acquired by CPS of another sidelink process, and a sensing result acquired at a discontinuous reception DRX active time.

Step 12: Performing resource exclusion.

Step 13: Performing resource selection.

In this embodiment, when expecting to perform resource selection or determining to perform resource selection, the user equipment UE performs at least one of determining a resource sensing mechanism, determining an existing resource sensing result, determining a candidate resource set, and determining a partial sensing occasion and performing partial sensing, and performs resource exclusion and resource selection. In a resource selection process, a resource sensing mechanism, an existing resource sensing result, a candidate resource set, and a partial sensing occasion are considered, so that it can be ensured that, in a power-saving mechanism, the existing sensing result is reused as much as possible, a more sufficient sensing result is used as much as possible in resource selection, and unnecessary sensing is repeatedly performed as few as possible, to ensure accuracy of resource selection and transmission reliability.

In an embodiment, the determining a candidate resource set in Step 11 includes:

- determining the candidate resource set based on target information, where the target information includes at least one of the following:
- an ending time of contiguous partial sensing CPS;
- a resource location at which resource exclusion capable of being performed corresponding to a sensing result acquired at a discontinuous reception DRX active time; and
- a resource location at which resource exclusion capable of being performed with a corresponding periodic-based partial sensing PBPS result.

In the foregoing embodiment, when a media access control (MAC) entity determines to perform resource selection of a single MAC protocol data unit (PDU) for a packet, a UE in sidelink and under a power-saving mechanism determines the candidate resource set based on at least one of the CPS ending time, the resource location at which resource exclusion capable of being performed corresponding to the sensing result acquired at the DRX active time, and the resource location at which resource exclusion capable of being performed with the corresponding PBPS result. A CPS candidate resource is determined by considering a plurality of available sensing results, considering aligning a plurality of candidate resources to sensing resources, reusing the existing sensing result as much as possible, using the more sufficient sensing result as much as possible during resource selection, and repeatedly performing unnecessary sensing as few as possible, so that power saving performance and reliability can be ensured.

Specifically, the determining the candidate resource set based on the target information includes the following cases:

Case 1: In a case in which the target information includes an ending time of a CPS, the determining the candidate resource set based on the target information includes:

Manner 1:

In a case of TB<0 or TB=0, a determination condition of a parameter T1 for determining a starting time of a resource selection window is: $0 \le T1 \le T_{proc,1}$.

In a case of TB>0, a determination condition of a parameter T1 for determining a starting time of a resource selection window is: $TB \le T1 \le TB + T_{proc,1}$.

$T_{proc,1}$ denotes a resource selection time and a transmission preparation time; and TB denotes a parameter for determining an ending time of a CPS window.

Further, T2>T1 or T2≥T1+L.

T2 denotes a parameter for determining an ending time of the resource selection window, and L denotes a minimum time or a minimum quantity of time domain resources in the resource selection window.

It should be noted that in Manner 1, an execution time of the CPS is [n+TA, n+TB]. In a time period of the last $T_{proc,0}$ in the CPS window, it may be considered that there is no sensing result in the sensing processing time. That is, the sensing processing time $T_{proc,0}$ is determined to be included in the CPS window, that is, the sensing processing time is included in [n+TA, n+TB].

Manner 2:

In a case of TB<0 or TB=0, a determination condition of a parameter T1 for determining a starting time of a resource selection window is any one of the following:

$$0 \le T1 \le T_{proc,0} + T_{proc,1}; \text{ and}$$

$$T_{proc,0} \le T1 \le T_{proc,0} + T_{proc,1}.$$

In a case of TB>0, a determination condition of a parameter T1 for determining a starting time of a resource selection window is any one of the following:

$$TB \le T1 \le TB + T_{proc,0} + T_{proc,1}; \text{ and}$$

$$TB + T_{proc,0} \le T1 \le TB + T_{proc,0} + T_{proc,1},$$

$T_{proc,0}$ denotes a sensing processing time; $T_{proc,1}$ denotes a resource selection time and a transmission preparation time; and TB denotes a parameter for determining an ending time of a CPS window.

Further, T2>T1 or T2≥T1+L.

T2 denotes a parameter for determining an ending time of the resource selection window, and L denotes a minimum time or a minimum quantity of time domain resources in the resource selection window.

It should be noted that in Manner 2, an execution time of the CPS is [n+TA, n+TB]. A resource for which a sensing processing time is considered and there is no sensing result is not included in the CPS window. That is, the sensing processing time $T_{proc,\ 0}$ is determined to be not included in the CPS window, that is, not included in [n+TA, n+TB].

Case 2: In a case in which the target information includes the resource location at which resource exclusion capable of being performed corresponding to the sensing result acquired at the DRX active time, and/or the resource location at which resource exclusion capable of being performed with the corresponding PBPS result, the determining the candidate resource set based on the target information includes:

determining the candidate resource set based on the resource location at which resource exclusion capable of being performed corresponding to the sensing result acquired at the DRX active time, and/or the resource location at which resource exclusion capable of being performed with the corresponding PBPS result; and determining a time domain location, obtained by considering a processing time, of the first time domain candidate resource in the determined candidate resource set as a location of n+TB.

The considering a processing time includes subtracting or not subtracting the processing time; and n+TB denotes an ending time of a CPS window.

In an embodiment, there are following manners for determining the candidate resource set based on the resource location at which resource exclusion capable of being performed corresponding to the sensing result acquired at the DRX active time, and/or the resource location at which resource exclusion capable of being performed with the corresponding PBPS result.

Manner 1

A target resource, in the resource location at which resource exclusion capable of being performed corresponding to the sensing result acquired at the DRX active time, meeting the following condition is preferentially determined as a candidate resource in the candidate resource set:

n+T1≤Time domain location where the target resource is located≤n+remaining packet delay budget (remaining packet delay budget (PDB)).

Manner 2

A target resource, in the resource location at which resource exclusion capable of being performed with the corresponding PBPS result, meeting the following condition is preferentially determined as a candidate resource in the candidate resource set:

n+T1≤Time domain location where the target resource is located≤n+remaining packet delay budget (remaining PDB).

Manner 3

A target resource, in the resource location at which resource exclusion capable of being performed corresponding to the sensing result acquired at the DRX active time or in the resource location at which resource exclusion capable of being performed with the corresponding PBPS result, meeting the following condition is preferentially determined as a candidate resource in the candidate resource set:

n+T1≤Time domain location where the target resource is located≤n+remaining packet delay budget (remaining PDB).

In the foregoing three manners in Case 2, the time domain location of the target resource is N time domain locations closest to n+T1, where N is a positive integer; n+T1 denotes a starting time of a resource selection window; and T1 is a parameter for determining a starting time of a resource selection window.

Case 3: In a case of TB<0 or TB=0, the method further includes:

when a packet arrives, if an existing CPS sensing result meets a requirement, determining the candidate resource set without considering alignment with a candidate resource corresponding to the sensing result acquired through the PBPS, and/or without considering alignment with a candidate resource corresponding to the sensing result acquired at the DRX active time; or randomly determining to directly perform resource selection; or determining the candidate resource set according to Manner 1 to Manner 3 in Case 2.

In Case 3, from a perspective of reducing delay and saving power, when a packet arrives, there have been sufficient sensing results acquired through the CPS, and there are sensing results, capable of being used, obtained through the PBPS, and/or at the DRX active time. Therefore, the user equipment UE directly performs resource selection, regardless of the sensing results acquired through the PBPS and/or at the DRX active time.

In the foregoing embodiment, one or more operations are considered, such as reusing an existing sensing result as much as possible, aligning a candidate set from the CPS as much as possible with a resource on which existing PBPS may correspondingly perform reserved resource exclusion, aligning the candidate set from the CPS as much as possible with a resource on which existing CPS may correspondingly perform reserved resource exclusion, and aligning the candidate set from the CPS as much as possible with a resource on which discontinuous reception DRX may correspondingly perform reserved resource exclusion, so that a candidate resource set corresponding to the CPS can be determined, and transmission reliability is also ensured.

In addition, from another perspective, in a specific case, such as a low-latency transmission and/or a high-reliability requirement, to avoid that overlapping of the determined candidate resource set with a potential candidate resource set in another process causes problems such as a potential selected transmission resource is discarded or a new resource is selected because concurrent transmission cannot be performed because the potential selected transmission resource overlaps a transmission resource in another process in time domain, or concurrent transmission is performed but reduced power is required, another method may alternatively be performed as follows.

During determining of the candidate resource set, based on a resource location at which existing PBPS may correspondingly perform reserved resource exclusion, a resource location at which existing CPS may correspondingly perform reserved resource exclusion, and a resource location at which discontinuous reception DRX may correspondingly perform reserved resource exclusion, at least one of the following three types of resources is excluded from the candidate resource set.

In an embodiment, before Step 12, the method further includes the following two manners of determining the target quantity of resource reservations.

Manner A1:

In a case in which periodic reservation information obtained by decoding SCI indicates that resource reservation is performed in a next period, the target quantity of resource reservations is determined based on a value of K which is a parameter in parameters for determining a sensing occasion and is used for determining a quantity of sensing execution times.

The value of K is indicated by configuration or preconfiguration.

It should be noted that, in the case in which the periodic reservation information obtained by decoding the SCI indicates that resource reservation is performed in a next period, the target quantity of resource reservations is assumed or considered as a quantity of periodic reservations indicated by the SCI according to agreement of a protocol. If K is not configured, performing sensing corresponding to a PBPS period is by default performing sensing on a resource corresponding to the last sensing occasion determined based on a PBPS reference time. This may be agreed upon in a protocol or is equivalent to K=1 by default.

In this embodiment, when resource selection is performed based on the PBPS, the parameter K is determined for SCI reservation and a resource selection mechanism is enhanced based on an additionally configured sensing occasion, so that accuracy of resource selection and transmission reliability in a power-saving mechanism can be improved. The additional configuration is the PBPS sensing default execution manner, that is, in addition to a manner in which performing sensing corresponding to a PBPS period is performing sensing on a resource corresponding to the last sensing occasion determined based on a PBPS reference time, there is additional pre-configuration signaling or network configuration signaling corresponding to K, for example, a signaling name may be but not limited to an additional parameter for determining a quantity of periodic sensing occasions (additionalPeriodicSensingOccasion).

Specifically, the determining a target quantity of resource reservations based on a value of K which is a parameter in parameters for determining a sensing occasion and is used for determining a quantity of sensing execution times includes:

determine that the target quantity of periodic resource reservations is N times a quantity of periodic reservations indicated by the SCI, where N is any one of the following (1) to (6).

(1) N is the value of K.

That is, $P_{rsvp\_TX}\neq 0$, $P_{rsvp\_RX}$ obtained by decoding received SCI is not 0, and it is (pre)configured that a sensing quantity parameter K, corresponding to a sensing period, in a parameter for determining a PBPS occasion is greater than 1. In this case, the quantity of periodic resource reservations indicated by the SCI is assumed or considered according to agreement of a protocol as K times a quantity of reservations indicated by the SCI according to a definition in a related mechanism.

For example, FIG. 2 and FIG. 3 show schematic diagrams of quantities of periodic reservations (target quantity of periodic reservations) indicated by the SCI and assumed or considered according to agreement of a protocol when K=3 and K=2, respectively.

(2) N is a maximum value in a set of values of K.

That is, $P_{rsvp\_TX}\neq 0$, $P_{rsvp\_RX}$ obtained by decoding received SCI is not 0, and it is (pre)configured that a sensing quantity parameter $K_{max}$, corresponding to a sensing period, in a parameter for determining a PBPS occasion is greater than 1. In this case, the quantity of periodic resource reservations indicated by the SCI is assumed or considered according to agreement of a protocol as $K_{max}$ times a quantity of reservations indicated by the SCI according to a definition in a related mechanism.

For example, FIG. 4 shows a schematic diagram in which a quantity of periodic reservations (target quantity of periodic reservations) indicated by the SCI is assumed or considered according to agreement of a protocol as $K_{max}$=3 when K={2,3}.

(3) N is a maximum value indicated in a bitmap of the value of K.

That is, $P_{rsvp\_TX}\neq 0$, $P_{rsvp\_RX}$ obtained by decoding received SCI is not 0, and it is (pre)configured that a sensing quantity parameter $K_{max}$, corresponding to a sensing period, in a parameter for determining a PBPS occasion is greater than 1. In this case, if the value of K is configured according to the bitmap, for example, 1110000000 represents K={1,2,3}, or 0000000111 represents K={1,2,3}, the quantity of periodic resource reservations indicated by the SCI is assumed or considered according to agreement of a protocol as $K_{max}$ times a quantity of reservations indicated by the SCI according to a definition in a related mechanism.

Note: Bitmap is not limited to 10 bits, or may be another bit, for example, 16 bits, and a specific indication meaning corresponding to a specific bit is also not limited.

For example, FIG. 5 shows a schematic diagram in which a quantity of periodic reservations (target quantity of periodic reservations) indicated by the SCI is assumed or considered according to agreement of a protocol as $K_{max}$=3 when K=1110000000.

(4) N is a value corresponding to a current sensing occasion in a sensing occasion determined based on the value of K.

That is, $P_{rsvp\_TX}\neq 0$, $P_{rsvp\_RX}$ obtained by decoding received SCI is not 0, and it is (pre)configured that a sensing quantity parameter $K_{max}$, corresponding to a sensing period, in a parameter for determining a PBPS occasion is greater than 1. In this case, if the current sensing occasion is $P_{reserve}$xi, the quantity of periodic resource reservations indicated by the SCI is assumed or considered according to agreement of a protocol as i times a quantity of reservations indicated by the SCI according to a definition in a related mechanism.

For example, FIG. 6 shows a schematic diagram in which a quantity of periodic reservations (target quantity of periodic reservations) indicated by the SCI is assumed or considered according to agreement of a protocol as K=3.

(5) N is a value corresponding to a current sensing occasion in a set of values of K.

That is, $P_{rsvp\_TX}\neq 0$, $P_{rsvp\_RX}$ obtained by decoding received SCI is not 0, and it is (pre)configured that a sensing quantity parameter $K_{max}$, corresponding to a sensing period, in a parameter for determining a PBPS occasion is greater than 1. In this case, if the current sensing occasion is $P_{reserve}$xi, the quantity of periodic resource reservations indicated by the SCI is assumed or considered according to agreement of a protocol as i times a quantity of reservations indicated by the SCI according to a definition in a related mechanism.

For example, FIG. 7 shows a schematic diagram in which a quantity of periodic reservations (target quantity of periodic reservations) indicated by the SCI is assumed or considered according to agreement of a protocol as $K_{max}$=3 when K={2,3}.

(6) N is a value corresponding to a current sensing occasion in a sensing occasion determined by using a bitmap of the value of K.

That is, $P_{rsvp\_TX}\neq 0$, $P_{rsvp\_RX}$ obtained by decoding received SCI is not 0, and it is (pre)configured that a sensing quantity parameter $K_{max}$, corresponding to a sensing period, in a parameter for determining a PBPS occasion is greater than 1. In this case, if the value of K is configured according to the bitmap, for example, 1110000000 represents K={1,2,3}, or 0000000111 represents K={1,2,3}, the quantity of periodic resource reservations indicated by the SCI is assumed or considered according to agreement of a protocol as $K_{max}$ times a quantity of reservations indicated by the SCI according to a definition in a related mechanism.

Note: Bitmap is not limited to 10 bits, or may be another bit, for example, 16 bits, and a specific indication meaning corresponding to a specific bit is also not limited.

Figure 8:
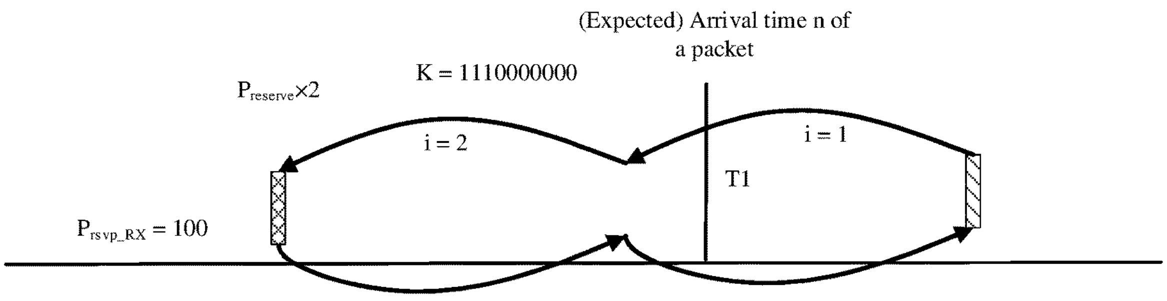
FIG. 8 is a schematic diagram 7 of periodic resource reservation according to an embodiment of the present disclosure.

For example, FIG. 8 shows a schematic diagram in which a quantity of periodic reservations (target quantity of periodic reservations) indicated by the SCI is assumed or considered according to agreement of a protocol as $K_{max}=3$ when K=1110000000.

Manner A2:

In a case in which periodic reservation information obtained by decoding SCI indicates that resource reservation is performed in a next period, it is determined that a target quantity of periodic resource reservations is a first value, and the first value=⌈(reference time of partial sensing resource−time at which the SCI is received)/$P_{rsvp\_RX}$⌉.

$P_{rsvp\_RX}$ denotes a resource reservation period indication value obtained by decoding the SCI.

That is, $P_{rsvp\_TX}\neq0$, $P_{rsvp\_RX}$ obtained by decoding received SCI is not 0, and it is (pre)configured that a sensing quantity parameter K or $K_{max}$, corresponding to a sensing period, in a parameter for determining a PBPS occasion is greater than 1. In this case, the quantity of periodic resource reservations indicated by the SCI is assumed or considered according to agreement of a protocol as ⌈(reference time of partial sensing resource−time at which the SCI is received)/$P_{rsvp\_RX}$⌉ times a quantity of reservations indicated by the SCI according to a definition in a related mechanism, that is, the quantity of reservations may ensure that a resource reserved according to the value of $P_{rsvp\_RX}$ indicated by the SCI may be mapped to a location after the reference time.

Figure 9:
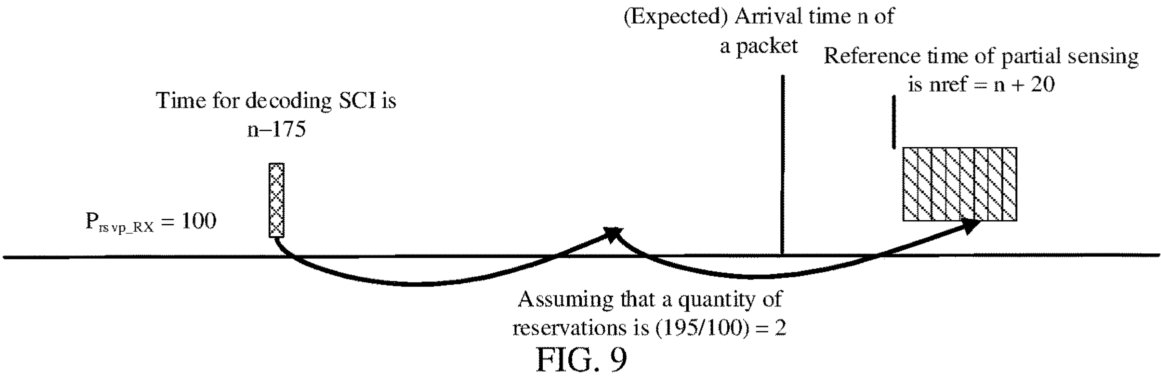
FIG. 9 is a schematic diagram 8 of periodic resource reservation according to an embodiment of the present disclosure.

As shown in FIG. 9, a time at which SCI is received is n−175, $P_{rsvp\_RX}=100$, and a reference time of a partial sensing resource is n+20, In this case, N=⌈((n+20)−(n−175))/100⌉=⌈195/100⌉=2, where n is an arrival time of a packet.

In an embodiment, the method further includes:

when a resource reservation period indication value $P_{rsvp\_RX}$ obtained by decoding the SCI is less than or equal to a first threshold $T_{scal}$, assuming or considering, according to agreement of a protocol, the quantity of periodic reservations indicated by the received SCI as Q times the target quantity of periodic reservations.

The first threshold $T_{scal}$=T2 or $T_{scal}$=100 ms, T2 is a parameter for determining an ending time of a resource selection window, and Q=⌈$T_{scal}/P_{rsvp\_RX}$⌉.

Figure 10:
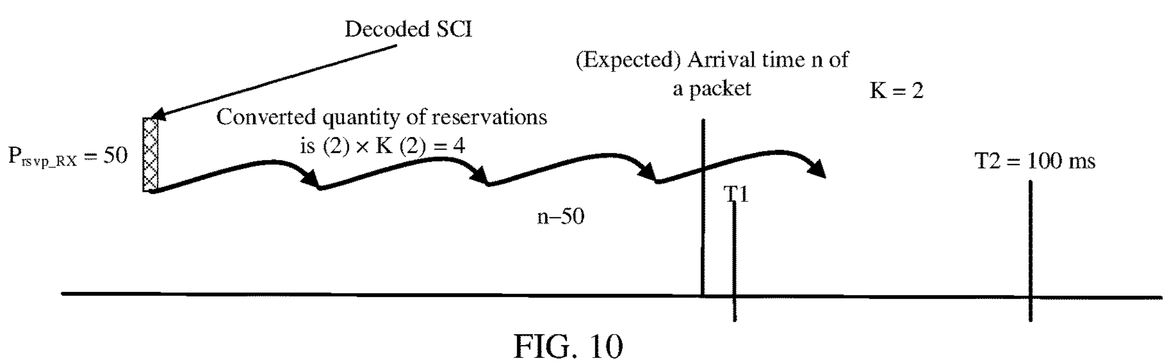
FIG. 10 is a schematic diagram 9 of periodic resource reservation according to an embodiment of the present disclosure.

For example, as shown in FIG. 10, if the target quantity of periodic reservations is 2, and Q=⌈100/50⌉, the quantity of periodic reservations indicated by the received SCI is assumed or considered according to agreement of a protocol as 2×2=4.

In an embodiment, the method further includes:

in a case in which a resource reservation period indication value $P_{rsvp\_RX}$ obtained by decoding the SCI is less than or equal to a first threshold $T_{scal}$ and a first condition is met, assuming or considering, according to agreement of a protocol, the quantity of periodic reservations indicated by the received SCI as any one of the following:

being determined as Q times;

being determined as Q times when the target quantity of periodic reservations is greater than or equal to Q;

being determined as Q times the target quantity of periodic reservations when the target quantity of periodic reservations is greater than or equal to Q; and being determined as Q times when the target quantity of periodic reservations is less than Q.

The first condition includes:

$$n' - m \leq P'_{rsvp\_RX}.$$

The first threshold $T_{scal}$=T2 or $T_{scal}$=100 ms, T2 is a parameter for determining an ending time of a resource selection window, Q=⌈$T_{scal}/P_{rsvp\_RX}$⌉, and n' denotes a logical slot corresponding to an arrival time of a packet or a logical slot of the closest first resource pool located after an arrival time of a packet; m denotes a slot for decoding the SCI; and $P'_{rsvp\_RX}$ denotes a quantity of logical slots correspondingly converted in a resource pool according to a resource reservation period indication value $P_{rsvp\_RX}$ obtained by decoding the SCI.

Figure 11:
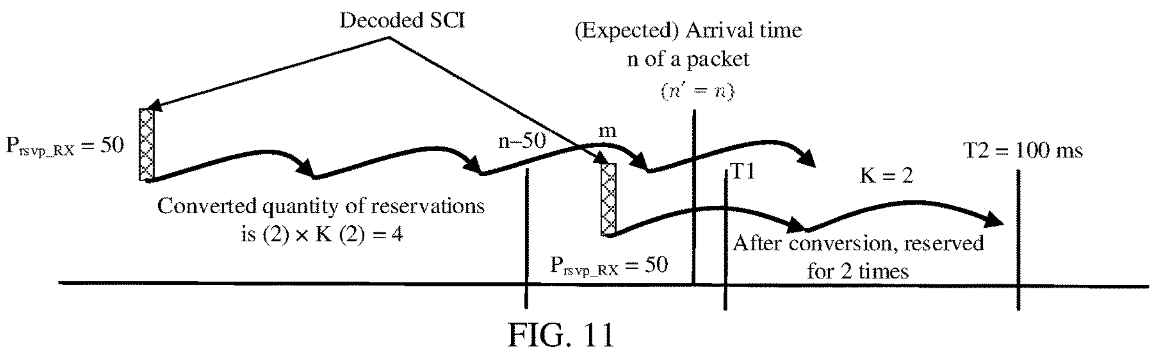
FIG. 11 is a schematic diagram 10 of periodic resource reservation according to an embodiment of the present disclosure.

For example, as shown in FIG. 11, because the SCI on the left does not meet the first condition ($n'-m\leq P'_{rsvp\_RX}$), the quantity of periodic reservations indicated by the received SCI is assumed as K times a converted quantity of periodic reservations, that is, a converted quantity of reservations is (2)×K (2)=4; and because the SCI on the right meets a first condition ($n'-m\leq P'_{rsvp\_RX}$) and $P'_{rsvp\_RX}=P_{rsvp\_RX}$, the quantity of periodic reservations indicated by the received SCI is assumed as a converted quantity Q of periodic reservations, that is, a quantity of reservations is only a converted quantity Q of reservations (equal to 2), and is no longer multiplied by K. In an embodiment, the determining a target quantity of resource reservations includes:

when a channel busy rate CBR measurement value is greater than or equal to a CBR threshold, determining the target quantity of resource reservations.

In this embodiment, the target quantity of resource reservations is determined when the channel busy rate CBR measurement value is greater than or equal to the CBR threshold. When a channel is not congested, potential sensing or decoding has relatively high reliability, and there is only a relatively small probability for occurrence of a case in which SCI decoding fails. Therefore, in this case, there is a low probability of a potentially significant decrease in reliability caused when enhancing a resource reservation mechanism indicated by SCI under partial sensing is not performed, and an enhancement solution may not be performed. Only when the channel busy rate CBR measurement value is greater than or equal to the CBR threshold, that is, when the channel is congested, the target quantity of resource reservations is determined according to the enhanced solution.

In an embodiment, the method further includes:

in a case in which a second condition is met, skipping an operation of determining the target quantity of resource reservations.

The second condition is as follows: before a reference time and after i $P_{rsvp\_RX}$ corresponding to decoding of SCI, any corresponding SCI is successfully decoded, and the successfully decoded SCI indicates that subsequently no resource is periodically reserved. The reference time is a time obtained by subtracting or not subtracting a processing time from a time domain resource where the first candidate resource is located, and i is an integer greater than or equal to 1.

This embodiment specifically includes simplifying processing according to a source address (Source identity (ID)) and a destination address (Destination ID) at a physical layer. That is, after i periods ($P_{rsvp\_RX}$) corresponding to decoding of SCI, SCI with the same source ID and destination ID at the physical layer is successfully decoded at a corresponding resource location, and indicates that subsequently no resource is periodically reserved, that is, $P_{rsvp\_RX}=0$. In this case, the extension reservation of the SCI is no longer valid.

Embodiment 2

Figure 12:
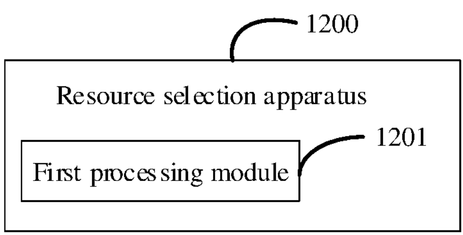
FIG. 12 is a structural block diagram of a resource selection apparatus for sidelink according to an embodiment of the present disclosure.

As shown in FIG. 12, an embodiment of the present disclosure provides a resource selection apparatus 1200 for sidelink, which is applied to a user equipment UE and includes:

a first processing module 1201, configured to perform the following steps when the UE expects to perform resource selection or determines to perform resource selection:

performing a target operation, where the target operation includes at least one of determining a resource sensing mechanism, determining an existing resource sensing result, determining a candidate resource set, and determining a partial sensing occasion and performing partial sensing;

performing resource exclusion; and performing resource selection.

In some implementations, the first processing module 1201 includes:

a first determining submodule, configured to determine the candidate resource set based on target information, where the target information includes at least one of the following:

an ending time of contiguous partial sensing CPS;

a resource location at which resource exclusion capable of being performed corresponding to a sensing result acquired at a discontinuous reception DRX active time; and a resource location at which resource exclusion capable of being performed with a corresponding periodic-based partial sensing PBPS result.

In some implementations, in a case in which the target information includes the ending time of the CPS, the first determining submodule is specifically configured to:

in a case of TB<0 or TB=0, a determination condition of a parameter T1 for determining a starting time of a resource selection window is: $0 \le T1 \le T_{proc,1}$;

in a case of TB>0, a determination condition of a parameter T1 for determining a starting time of a resource selection window is: $TB \le T1 \le TB+T_{proc,1}$.

$T_{proc,1}$ denotes a resource selection time and a transmission preparation time; and TB denotes a parameter for determining an ending time of a CPS window.

In some implementations, in a case in which the target information includes the ending time of the CPS, the first determining submodule is specifically configured to:

in a case of TB<0 or TB=0, a determination condition of a parameter T1 for determining a starting time of a resource selection window is any one of the following:

$$0 \le T1 \le T_{proc,0} + T_{proc,1}; \text{ and}$$

$$T_{proc,0} \le T1 \le T_{proc,0} + T_{proc,1};$$

in a case of TB>0, a determination condition of a parameter T1 for determining a starting time of a resource selection window is any one of the following:

$$TB \le T1 \le TB + T_{proc,0} + T_{proc,1}; \text{ and}$$

$$TB + T_{proc,0} \le T1 \le TB + T_{proc,0} + T_{proc,1}.$$

$T_{proc,0}$ denotes a sensing processing time; $T_{proc,1}$ denotes a resource selection time and a transmission preparation time; and TB denotes a parameter for determining an ending time of a CPS window.

In some implementations, T2>T1 or T2≥T1+L, where T2 denotes a parameter for determining an ending time of the resource selection window, and L denotes a minimum time or a minimum quantity of time domain resources in the resource selection window.

In some implementations, in a case of TB<0 or TB=0, the apparatus further includes:

a second processing module, configured to: when a packet arrives, if an existing CPS sensing result meets a requirement, determining the candidate resource set without considering alignment with a candidate resource corresponding to the sensing result acquired through the PBPS, and/or without considering alignment with a candidate resource corresponding to the sensing result acquired at the DRX active time.

In some implementations, in a case in which the target information includes the resource location at which resource exclusion capable of being performed corresponding to the sensing result acquired at the DRX active time, and/or the resource location at which resource exclusion capable of being performed with the corresponding PBPS result, the first determining submodule further includes:

a first determining unit, configured to determine the candidate resource set based on the resource location at which resource exclusion capable of being performed corresponding to the sensing result acquired at the DRX active time, and/or the resource location at which resource exclusion capable of being performed with the corresponding PBPS result; and a second determining unit, configured to determine a time domain location, obtained by considering a processing time, of the first time domain candidate resource in the determined candidate resource set as a location of n+TB.

The considering a processing time includes subtracting or not subtracting the processing time; and n+TB denotes an ending time of a CPS window.

In some implementations, the apparatus 1200 further includes:

a third processing module, configured to: in a case in which periodic reservation information obtained by decoding SCI indicates that resource reservation is performed in a next period, determine a target quantity of resource reservations based on a value of K which is a parameter in parameters for determining a sensing occasion and is used for determining a quantity of sensing execution times.

In some implementations, the value of K is configured or preconfigured for indication.

In some implementations, the third processing module includes:

a second determining submodule, configured to determine that the target quantity of periodic resource reservations is N times a quantity of periodic reservations indicated by the SCI, where N is any one of the following:

the value of K;

a maximum value in a set of values of K;

a maximum value indicated in a bitmap of the value of K;

a value corresponding to a current sensing occasion in a sensing occasion determined based on the value of K;

a value corresponding to a current sensing occasion in a set of values of K; and a value corresponding to a current sensing occasion in a sensing occasion determined by using a bitmap of the value of K.

In some implementations, the apparatus 1200 further includes:

a fourth processing module, configured to: in a case in which periodic reservation information obtained by decoding SCI indicates that resource reservation is performed in a next period, determine that a target quantity of periodic resource reservations is a first value, and the first value=⌈(reference time of partial sensing resource−time at which the SCI is received)/$P_{rsvp\_RX}$⌉.

$P_{rsvp\_RX}$ denotes a resource reservation period indication value obtained by decoding the SCI.

In some implementations, the apparatus 1200 further includes:

a fifth processing module, configured to: when a resource reservation period indication value $P_{rsvp\_RX}$ obtained by decoding the SCI is less than or equal to a first threshold $T_{scal}$, determine a quantity of periodic reservations indicated by the received SCI as Q times the target quantity of periodic reservations.

The first threshold $T_{scal}$=T2 or $T_{scal}$=100 ms, T2 is a parameter for determining an ending time of a resource selection window, and Q=⌈$T_{scal}$/$P_{rsvp\_RX}$⌉.

In some implementations, the apparatus 1200 further includes:

a sixth processing module, configured to: in a case in which a resource reservation period indication value $P_{rsvp\_RX}$ obtained by decoding the SCI is less than or equal to a first threshold $T_{scal}$ and a first condition is met, determine a quantity of periodic reservations indicated by the received SCI as any one of the following:

being determined as Q times;

being determined as Q times when the target quantity of periodic reservations is greater than or equal to Q;

being determined as Q times the target quantity of periodic reservations when the target quantity of periodic reservations is greater than or equal to Q; and being determined as Q times when the target quantity of periodic reservations is less than Q.

The first condition includes:

$$n' - m \leq P'_{rsvp\_RX}.$$

The first threshold $T_{scal}$=T2 or $T_{scal}$=100 ms, T2 is a parameter for determining an ending time of a resource selection window, Q=⌈$T_{scal}$/$P_{rsvp\_RX}$⌉, and n' denotes a logical slot corresponding to an arrival time of a packet or a logical slot of the closest first resource pool located after an arrival time of a packet; m denotes a slot for decoding the SCI; and $P'_{rsvp\_RX}$ denotes a quantity of logical slots correspondingly converted in a resource pool according to a resource reservation period indication value $P_{rsvp\_RX}$ obtained by decoding the SCI.

In some implementations, when determining the target quantity of resource reservations, the third processing module and the fourth processing module are specifically configured to:

when a channel busy rate CBR measurement value is greater than or equal to a CBR threshold, determine the target quantity of resource reservations.

In some implementations, the apparatus 1200 further includes:

a seventh processing module, configured to: in a case in which a second condition is met, skip an operation of determining the target quantity of resource reservations.

The second condition is as follows: before a reference time and after i $P_{rsvp\_RX}$ corresponding to decoded SCI, any corresponding SCI is successfully decoded, and the successfully decoded SCI indicates that subsequently no resource is periodically reserved. The reference time is a time obtained by subtracting or not subtracting a processing time from a time domain resource where the first candidate resource is located, and i is an integer greater than or equal to 1.

Embodiment 2 of the present disclosure is corresponding to the method in Embodiment 1. All implementation means in Embodiment 1 are applicable to embodiments of the resource selection apparatus for sidelink, and same technical effect can be achieved.

Embodiment 3

Figure 13:
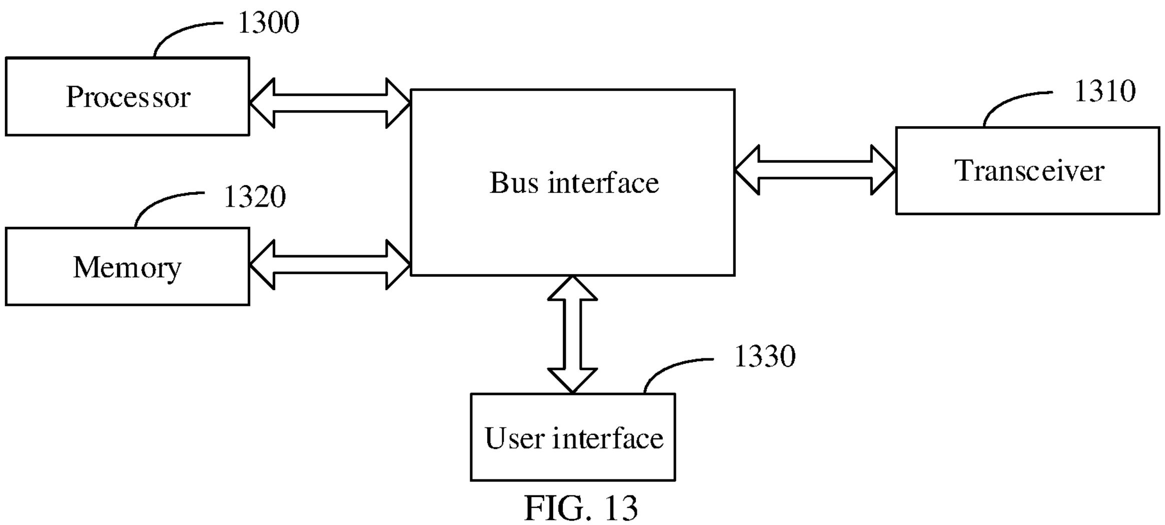
FIG. 13 is a schematic structural diagram of hardware of a user equipment according to an embodiment of the present disclosure.

To better implement the foregoing objectives, as shown in FIG. 13, a third embodiment of the present disclosure further provides a user equipment, including:

a processor 1300; and a memory 1320 connected to the processor 1300 by using a bus interface. The memory 1320 is configured to store a program and data that are used when the processor 1300 operates, and the processor 1300 invokes and executes the program and data that are stored in the memory 1320.

A transceiver 1310 is connected to the bus interface, and is configured to receive and transmit data under control of the processor 1300. The processor 1300 is configured to read a program in the memory 1320.

Specifically, the processor 1300 is configured to: when the UE expects to perform resource selection or determines to perform resource selection, perform the following steps:

performing a target operation, where the target operation includes at least one of determining a resource sensing mechanism, determining an existing resource sensing result, determining a candidate resource set, and determining a partial sensing occasion and performing partial sensing;

performing resource exclusion; and performing resource selection.

In some implementations, when determining the candidate resource set, the processor 1300 is configured to determine the candidate resource set based on target information, where the target information includes at least one of the following:

an ending time of contiguous partial sensing CPS;

a resource location at which resource exclusion capable of being performed corresponding to a sensing result acquired at a discontinuous reception DRX active time; and a resource location at which resource exclusion capable of being performed with a corresponding periodic-based partial sensing PBPS result.

In some implementations, in a case in which the target information includes the ending time of the CPS, when determining the candidate resource set according to the target information, the processor 1300 is configured to:

in a case of TB<0 or TB=0, a determination condition of a parameter T1 for determining a starting time of a resource selection window is: $0 \le T1 \le T_{proc,1}$;

in a case of TB>0, a determination condition of a parameter T1 for determining a starting time of a resource selection window is: $TB \le T1 \le TB + T_{proc,1}$.

$T_{proc,1}$ denotes a resource selection time and a transmission preparation time; and TB denotes a parameter for determining an ending time of a CPS window.

In some implementations, in a case in which the target information includes the ending time of the CPS, when determining the candidate resource set according to the target information, the processor 1300 is configured to:

in a case of TB<0 or TB=0, a determination condition of a parameter T1 for determining a starting time of a resource selection window is any one of the following:

$$0 \le T1 \le T_{proc,0} + T_{proc,1}; \text{ and}$$

$$T_{proc,0} \le T1 \le T_{proc,0} + T_{proc,1};$$

in a case of TB>0, a determination condition of a parameter T1 for determining a starting time of a resource selection window is any one of the following:

$$TB \le T1 \le TB + T_{proc,0} + T_{proc,1}; \text{ and}$$

$$TB + T_{proc,0} \le T1 \le TB + T_{proc,0} + T_{proc,1}.$$

$T_{proc,0}$ denotes a sensing processing time; $T_{proc,1}$ denotes a resource selection time and a transmission preparation time; and TB denotes a parameter for determining an ending time of a CPS window.

In some implementations, T2>T1 or T2≥T1+L, where T2 denotes a parameter for determining an ending time of the resource selection window, and L denotes a minimum time or a minimum quantity of time domain resources in the resource selection window.

In some implementations, when TB<0 or TB=0, the processor 1300 is further configured to: when a packet arrives, if an existing CPS sensing result meets a requirement, determining the candidate resource set without considering alignment with a candidate resource corresponding to the sensing result acquired through the PBPS, and/or without considering alignment with a candidate resource corresponding to the sensing result acquired at the DRX active time.

In some implementations, in a case in which the target information includes the resource location at which resource exclusion capable of being performed corresponding to the sensing result acquired at the DRX active time, and/or the resource location at which resource exclusion capable of being performed with the corresponding PBPS result, the processor 1300 is further configured to: determine the candidate resource set based on the resource location at which resource exclusion capable of being performed corresponding to the sensing result acquired at the DRX active time, and/or the resource location at which resource exclusion capable of being performed with the corresponding PBPS result; and determine a time domain location, obtained by considering a processing time, of the first time domain candidate resource in the determined candidate resource set as a location of n+TB. The considering a processing time includes subtracting or not subtracting the processing time; and n+TB denotes an ending time of a CPS window.

In some implementations, before performing resource exclusion, the processor 1300 is further configured to:

in a case in which periodic reservation information obtained by decoding SCI indicates that resource reservation is performed in a next period, determine a target quantity of resource reservations based on a value of K which is a parameter in parameters for determining a sensing occasion and is used for determining a quantity of sensing execution times.

In some implementations, the value of K is configured or preconfigured for indication.

In some implementations, when determining the value of the parameter K based on the quantity of sensing execution times in the parameter for determining a sensing occasion, and determining the target quantity of resource reservations, the processor 1300 is specifically configured to:

determine that the target quantity of periodic resource reservations is N times a quantity of periodic reservations indicated by the SCI, where N is any one of the following:

the value of K;

a maximum value in a set of values of K;

a maximum value indicated in a bitmap of the value of K;

a value corresponding to a current sensing occasion in a sensing occasion determined based on the value of K;

a value corresponding to a current sensing occasion in a set of values of K; and a value corresponding to a current sensing occasion in a sensing occasion determined by using a bitmap of the value of K.

In some implementations, before performing resource exclusion, the processor 1300 is further configured to:

in a case in which periodic reservation information obtained by decoding SCI indicates that resource reservation is performed in a next period, determine that a target quantity of periodic resource reservations is a first value, and the first value=⌈(reference time of partial sensing resource−time at which the SCI is received)/$P_{rsvp\_RX}$⌉.

$P_{rsvp\_RX}$ denotes a resource reservation period indication value obtained by decoding the SCI.

In some implementations, the processor 1300 is further configured to:

when a resource reservation period indication value $P_{rsvp\_RX}$ obtained by decoding the SCI is less than or equal to a first threshold $T_{scal}$, determine a quantity of periodic reservations indicated by the received SCI as Q times the target quantity of periodic reservations.

The first threshold $T_{scal}$=T2 or $T_{scal}$=100 ms, T2 is a parameter for determining an ending time of a resource selection window, and $Q=\lceil T_{scal}/P_{rsvp\_RX} \rceil$.

In some implementations, the processor 1300 is further configured to:

in a case in which a resource reservation period indication value $P_{rsvp\_RX}$ obtained by decoding the SCI is less than or equal to a first threshold $T_{scal}$ and a first condition is met, determine a quantity of periodic reservations indicated by the received SCI as any one of the following:

being determined as Q times;

being determined as Q times when the target quantity of periodic reservations is greater than or equal to Q;

being determined as Q times the target quantity of periodic reservations when the target quantity of periodic reservations is greater than or equal to Q; and being determined as Q times when the target quantity of periodic reservations is less than Q.

The first condition includes:

$$n' - m \leq P'_{rsvp\_RX}.$$

The first threshold $T_{scal}$=T2 or $T_{scal}$=100 ms, T2 is a parameter for determining an ending time of a resource selection window, $Q=\lceil T_{scal}/P_{rsvp\_RX} \rceil$, and n' denotes a logical slot corresponding to an arrival time of a packet or a logical slot of the closest first resource pool located after an arrival time of a packet; m denotes a slot for decoding the SCI; and $P'_{rsvp\_RX}$ denotes a quantity of logical slots correspondingly converted in a resource pool according to a resource reservation period indication value $P_{rsvp\_RX}$ obtained by decoding the SCI.

In some implementations, when determining the target quantity of resource reservations, the processor 1300 is further configured to:

when a channel busy rate CBR measurement value is greater than or equal to a CBR threshold, determine the target quantity of resource reservations.

In some implementations, the processor 1300 is further configured to:

in a case in which a second condition is met, skip an operation of determining the target quantity of resource reservations.

The second condition is as follows: before a reference time and after i $P_{rsvp\_RX}$ corresponding to decoded SCI, any corresponding SCI is successfully decoded, and the successfully decoded SCI indicates that subsequently no resource is periodically reserved. The reference time is a time obtained by subtracting or not subtracting a processing time from a time domain resource where the first candidate resource is located, and i is an integer greater than or equal to 1.

In FIG. 13, a bus architecture may include any quantity of interconnected buses and bridges, and specifically interconnect various circuits of one or more processors represented by the processor 1300 and a memory represented by the memory 1320. The bus architecture may further interconnect various other circuits such as a peripheral device, a voltage regulator, and a power management circuit. These are all well known in the art, and therefore are not further described in this specification. The bus interface provides an interface. The transceiver 1310 may be a plurality of components, including a transmitter and a transceiver, and provides units for communicating with a variety of other apparatuses on a transmission medium. For different terminals, a user interface 1330 may alternatively be an interface capable of externally or internally connecting a required device, and the connected device includes, but is not limited to, a keypad, a display, a speaker, a microphone, a joystick, and the like. The processor 1300 is responsible for management of the bus architecture and general processing, and the memory 1320 may store data for use by the processor 1300 when the processor 1300 operates.

According to the user equipment UE provided in the present disclosure, when expecting to perform resource selection or determining to perform resource selection, the UE performs at least one of determining a resource sensing mechanism, determining an existing resource sensing result, determining a candidate resource set, and determining a partial sensing occasion and performing partial sensing, and performs resource exclusion and resource selection. In a resource selection process, a resource sensing mechanism, an existing resource sensing result, a candidate resource set, and a partial sensing occasion are considered, so that it can be ensured that, in a power-saving mechanism, the existing sensing result is reused as much as possible, a more sufficient sensing result is used as much as possible in resource selection, and unnecessary sensing is repeatedly performed as few as possible, to ensure accuracy of resource selection and transmission reliability.

A person skilled in the art may understand that all or some of the steps of the foregoing embodiments may be implemented by hardware, or may be implemented by a computer program indicating related hardware, and the computer program includes instructions for executing some or all of the steps of the foregoing methods. In addition, the computer program may be stored in a readable storage medium, and the storage medium may be any form of storage medium.

In addition, a specific embodiment of the present disclosure further provides a computer-readable storage medium, on which a computer program is stored. When the program is executed by a processor, steps of the method in Embodiment 1 are implemented. A same technical effect can be achieved. To avoid repetition, details are not described herein again.

In addition, it should be noted that, in the apparatus and method of the present disclosure, it is obvious that each component or step may be decomposed and/or recombined. The decomposition and/or the recombination shall be considered equivalent solutions to the present disclosure. In addition, the steps for performing the foregoing series of processing may be performed in a chronological order as described, but do not necessarily need to be performed in a chronological order, and some of the steps may be performed in parallel or independently of one another. A person of ordinary skill in the art can understand that all or any of the steps or components of the methods and apparatuses of the present disclosure may be implemented in any computing apparatus (including a processor, a storage medium, or the like) or a network of a computing apparatus by using hardware, firmware, software, or a combination thereof, which can be implemented by a person of ordinary skill in the art by using their basic programming skills when reading the description of the present disclosure.

Therefore, the objectives of the present disclosure may also be achieved by running a program or a group of programs on any computing apparatus. The computing apparatus may be a well-known general apparatus. Therefore, the objectives of the present disclosure may also be achieved by providing only a program product including program code for implementing the methods or apparatuses. In other words, such a program product is also included in the present disclosure, and a storage medium that stores such a program product is also included in the present disclosure. Obviously, the storage medium may be any well-known storage medium or any storage medium developed in the future. It should also be noted that in the apparatuses and methods of the present disclosure, it is obvious that each component or step may be decomposed and/or recombined. The decomposition and/or the recombination shall be considered equivalent solutions to the present disclosure. In addition, the steps for performing the foregoing series of processing may be performed in a chronological order as described, but do not necessarily need to be performed in a chronological order. Some of the steps may be performed in parallel or independently of one another.

It should be noted that the foregoing module division is merely a logical function division. In actual implementation, all or some of the modules may be integrated into one physical entity, or may be physically separated. In addition, these modules may be implemented in a form of software invoked by a processing element; or may be all implemented in a form of hardware; or some modules may be implemented in a form of software invoked by a processing element, and some modules may be implemented in a form of hardware. For example, a determining module may be a separately disposed processing element, or may be integrated into a chip of the foregoing apparatus for implementation. In addition, the determining module may be stored in a memory of the foregoing apparatus in a form of program code, and a processing element of the foregoing apparatus invokes the program code and executes a function of the determining module. An implementation of another module is similar. In addition, all or some of the modules may be integrated together, or may be independently implemented. The processing element herein may be an integrated circuit having a signal processing capability. In an implementation process, the steps in the foregoing methods or the foregoing modules may be completed by an integrated logic circuit of hardware in the processor element or instructions in a form of software.

For example, modules, units, subunits, or submodules may be configured to implement one or more integrated circuits in the foregoing methods, for example, one or more application specific integrated circuits (ASIC), or one or more digital signal processors (DSP), or one or more field programmable gate arrays (FPGA), or the like. For another example, when a module is implemented in the form of program code being scheduled by a processing element, the processing element may be a general-purpose processor, for example, a central processing unit (CPU) or another processor capable of invoking the program code. For another example, these modules may be integrated together and implemented in a form of a system-on-a-chip (SOC).

The terms "first", "second" and the like in this specification and claims of the present disclosure are used to distinguish between similar objects, rather than to describe a particular order or a sequential order. It should be understood that the data used in this way may be interchangeable under appropriate circumstances such that embodiments of the present disclosure described herein are implemented, for example, in an order different from that illustrated or described herein. In addition, the terms "include" and "have" and any other variants thereof are intended to cover the non-exclusive inclusion. For example, a process, method, system, product, or device that includes a series of steps or units is not necessarily limited to those expressly listed steps or units, but may include other steps or units not expressly listed or inherent to such process, method, product, or device. In addition, in the specification and claims, "and/or" is used to indicate at least one of connected objects. For example, A and/or B and/or C represents the following seven cases: Only A is included, only B is included, only C is included, both A and B exist, both B and C exist, both A and C exist, and A, B and C all exist. Similarly, "at least one of A and B" used in this specification and claims should be understood as "only A is included, only B is included, or both A and B exist".

The foregoing descriptions are merely the preferred implementations of the present disclosure. It should only be noted that those of ordinary skill in the art may further make various improvements and modifications without departing from the principles of the present disclosure, and these improvements and modifications also fall within the protection scope of the present disclosure.

What is claimed is:

1. A resource selection method for sidelink, applied to a user equipment (UE), comprising:

when the UE expects to perform resource selection or determines to perform resource selection, performing following steps:

performing a target operation, wherein the target operation comprises determining a candidate resource set;

performing resource exclusion; and performing resource selection;

wherein the determining a candidate resource set comprises:

determining the candidate resource set based on target information, wherein the target information comprises:

a resource location with a corresponding periodic-based partial sensing (PBPS) result, wherein the method further comprises:

determining the candidate resource set based on the resource location with a corresponding PBPS result; and determining a time domain location, obtained by considering a processing time, of the first time domain candidate resource in the determined candidate resource set as a location of n+TB, wherein the considering a processing time comprises subtracting or not subtracting the processing time; and n+TB denotes an ending time of a contiguous partial sensing (CPS) window.

2. The resource selection method for sidelink according to claim 1, wherein in a case that the target information comprises the ending time of the CPS, the determining the candidate resource set based on target information comprises that:

in a case of TB<0 or TB=0, a determination condition of a parameter T1 for determining a starting time of a resource selection window is: $0 \le T1 \le T_{proc,1}$;

in a case of TB>0, the determination condition of the parameter T1 for determining the starting time of the resource selection window is: $TB \le T1 \le TB + T_{proc,1}$, wherein $T_{proc,1}$ denotes a resource selection time and a transmission preparation time; and TB denotes a parameter for determining an ending time of a CPS window.

3. The resource selection method for sidelink according to claim 1, wherein in a case that the target information comprises the ending time of the CPS, the determining the candidate resource set based on target information comprises that:

in a case of TB<0 or TB=0, a determination condition of a parameter T1 for determining a starting time of a resource selection window is any one of following:

$$0 \le T1 \le T_{proc,0} + T_{proc,1}; \text{ and}$$

$$T_{proc,0} \le T1 \le T_{proc,0} + T_{proc,1},$$

in a case of TB>0, the determination condition of the parameter T1 for determining the starting time of the resource selection window is any one of following:

$$TB \le T1 \le TB + T_{proc,0} + T_{proc,1}; \text{ and}$$

$$TB + T_{proc,0} \le T1 \le TB + T_{proc,0} + T_{proc,1},$$

wherein $T_{proc,0}$ denotes a sensing processing time; $T_{proc,1}$ denotes a resource selection time and a transmission preparation time; and TB denotes a parameter for determining an ending time of a CPS window.

4. The resource selection method for sidelink according to claim 2, wherein the method further comprises:

$$T2 > T1 \text{ or } T2 \geq T1 + L,$$

wherein T2 denotes a parameter for determining an ending time of the resource selection window, and L denotes a minimum time or a minimum quantity of time domain resources in the resource selection window.

5. The resource selection method for sidelink according to claim 3, wherein the method further comprises:

$$T2 > T1 \text{ or } T2 \geq T1 + L,$$

wherein T2 denotes a parameter for determining an ending time of the resource selection window, and L denotes a minimum time or a minimum quantity of time domain resources in the resource selection window.

6. The resource selection method for sidelink according to claim 2, wherein in a case of TB<0 or TB=0, the method further comprises:

when a packet arrives, if an existing CPS sensing result meets a requirement, determining the candidate resource set without considering alignment with a candidate resource corresponding to the sensing result acquired through the PBPS, and/or without considering alignment with a candidate resource corresponding to the sensing result acquired at the DRX active time.

7. The resource selection method for sidelink according to claim 1, wherein the target operation comprises at least one of determining a resource sensing mechanism, determining an existing resource sensing result, and determining a partial sensing occasion and performing partial sensing.

8. The resource selection method for sidelink according to claim 1, wherein before the performing resource exclusion, the method further comprises:

in a case in which periodic reservation information obtained by decoding SCI indicates that resource reservation is performed in a next period, determining a target quantity of resource reservations based on a value of K which is a parameter in parameters for determining a sensing occasion and is used for determining a quantity of sensing execution times.

9. The resource selection method for sidelink according to claim 8, wherein the value of K is configured or preconfigured for indication.

10. The resource selection method for sidelink according to claim 8, wherein the determining a target quantity of resource reservations based on a value of K which is a parameter in parameters for determining a sensing occasion and is used for determining a quantity of sensing execution times comprises:

determining that the target quantity of resource reservations is N times a quantity of periodic reservations indicated by the SCI, wherein N is any one of following:

the value of K;

a maximum value in a set of values of K;

a maximum value indicated in a bitmap of the value of K;

a value corresponding to a current sensing occasion in a sensing occasion determined based on the value of K;

a value corresponding to a current sensing occasion in a set of values of K; and a value corresponding to a current sensing occasion in a sensing occasion determined by using a bitmap of the value of K.

11. The resource selection method for sidelink according to claim 1, wherein before the performing resource exclusion, the method further comprises:

in a case in which periodic reservation information obtained by decoding SCI indicates that resource reservation is performed in a next period, determining that a target quantity of resource reservations is a first value, and the first value=[(reference time of partial sensing resource−time at which the SCI is received)/$P_{rsvp\_RX}$], wherein $P_{rsvp\_RX}$ denotes a resource reservation period indication value obtained by decoding the SCI.

12. The resource selection method for sidelink according to claim 8, wherein the method further comprises:

when a resource reservation period indication value $P_{rsvp\_RX}$ obtained by decoding the SCI is less than or equal to a first threshold $T_{scal}$, determining a quantity of periodic reservations indicated by the received SCI as Q times the target quantity of resource reservations, wherein the first threshold $T_{scal}$=T2 or $T_{scal}$=100 ms, T2 is a parameter for determining an ending time of a resource selection window, and Q=[$T_{scal}/P_{rsvp\_RX}$].

13. The resource selection method for sidelink according to claim 11, wherein the method further comprises:

when a resource reservation period indication value $P_{rsvp\_RX}$ obtained by decoding the SCI is less than or equal to a first threshold $T_{scal}$, determining a quantity of periodic reservations indicated by the received SCI as Q times the target quantity of resource reservations, wherein the first threshold $T_{scal}$=T2 or $T_{scal}$=100 ms, T2 is a parameter for determining an ending time of a resource selection window, and Q=[$T_{scal}/P_{rsvp\_RX}$].

14. The resource selection method for sidelink according to claim 8, wherein the method further comprises:

in a case in which a resource reservation period indication value $P_{rsvp\_RX}$ obtained by decoding the SCI is less than or equal to a first threshold $T_{scal}$ and a first condition is met, determining a quantity of periodic reservations indicated by the received SCI as any one of the following:

being determined as Q times;

being determined as Q times when the target quantity of resource reservations is greater than or equal to Q;

being determined as Q times the target quantity of resource reservations when the target quantity of resource reservations is greater than or equal to Q; and being determined as Q times when the target quantity of resource reservations is less than Q, wherein the first condition comprises:

$$n' - m \leq P'_{rsvp\_RX};$$

wherein the first threshold $T_{scal}$=T2 or $T_{scal}$=100 ms, T2 is a parameter for determining an ending time of a resource selection window, Q=[$T_{scal}/P_{rsvp\_RX}$], and n' denotes a logical slot corresponding to an arrival time of a packet or a logical slot of the closest first resource pool located after an arrival time of a packet; m denotes a slot for decoding the SCI; and $P'_{rsvp\_RX}$ denotes a quantity of logical slots correspondingly converted in a resource pool according to a resource reservation period indication value $P_{rsvp\_RX}$ obtained by decoding the SCI.

15. The resource selection method for sidelink according to claim 11, wherein the method further comprises:

in a case in which a resource reservation period indication value $P_{rsvp\_RX}$ obtained by decoding the SCI is less than or equal to a first threshold $T_{scal}$ and a first condition is met, determining a quantity of periodic reservations indicated by the received SCI as any one of following:

being determined as Q times;

being determined as Q times when the target quantity of resource reservations is greater than or equal to Q;

being determined as Q times the target quantity of resource reservations when the target quantity of resource reservations is greater than or equal to Q; and being determined as Q times when the target quantity of resource reservations is less than Q, wherein the first condition comprises:

$$n' - m \leq P'_{rsvp\_RX};$$

wherein the first threshold $T_{scal}$=T2 or $T_{scal}$=100 ms, T2 is a parameter for determining an ending time of a resource selection window, $Q=[T_{scal}/P_{rsvp\_RX}]$, and n' denotes a logical slot corresponding to an arrival time of a packet or a logical slot of the closest first resource pool located after an arrival time of a packet; m denotes a slot for decoding the SCI; and $P'_{rsvp\_RX}$ denotes a quantity of logical slots correspondingly converted in a resource pool according to a resource reservation period indication value $P_{rsvp\_RX}$ obtained by decoding the SCI.

16. The resource selection method for sidelink according to claim 8, wherein the determining a target quantity of resource reservations comprises:

when a channel busy rate (CBR) measurement value is greater than or equal to a CBR threshold, determining the target quantity of resource reservations.

17. The resource selection method for sidelink according to claim 8, wherein the method further comprises:

in a case in which a second condition is met, skipping an operation of determining the target quantity of resource reservations, wherein the second condition is as follows: before a reference time and after i $P_{rsvp\_RX}$ corresponding to decoded SCI, any corresponding SCI is successfully decoded, and the successfully decoded SCI indicates that subsequently no resource is periodically reserved, wherein the reference time is a time obtained by subtracting or not subtracting a processing time from a time domain resource where the first candidate resource is located, and i is an integer greater than or equal to 1.

18. A user equipment, comprising a transceiver, a memory, a processor, and a computer program stored in the memory and capable of running on the processor, wherein when the processor executes the computer program, steps of the resource selection method for sidelink according to claim 1 are implemented.

19. A non-transitory computer-readable storage medium on which a computer program is stored, wherein when the computer program is executed by a processor, steps of the resource selection method for sidelink according to claim 1 are implemented.

* * * * *